United States Patent [19]

Gilman et al.

[11] 4,260,354

[45] Apr. 7, 1981

[54] SPONGES FOR USE IN REMOVING SEAMS FROM CLAY HANDLES

[75] Inventors: Michael Gilman, Leek; Robert M. Rushton, Stoke-on-Trent, both of England

[73] Assignee: Service (Engineers) Limited, Stoke-on-Trent, England

[21] Appl. No.: 78,450

[22] Filed: Sep. 24, 1979

[51] Int. Cl.³ .......................... B29C 1/00; B28B 11/18

[52] U.S. Cl. .................................. 425/227; 15/244 C; 15/244 R; 425/DIG. 120

[58] Field of Search ..................... 425/227, DIG. 120; 15/244 C, 244 R

[56] References Cited

U.S. PATENT DOCUMENTS

| | | | |
|---|---|---|---|
| 1,660,729 | 2/1928 | Strock | 15/244 C |
| 1,756,713 | 4/1930 | Vernet | 15/244 C |
| 2,197,326 | 4/1940 | Streyle | 15/244 R |
| 2,204,806 | 6/1940 | Lorenz et al. | 15/244 R |
| 2,214,219 | 9/1940 | Barrett | 15/244 R |
| 2,255,154 | 9/1941 | Esposito | 15/244 R |
| 2,841,811 | 7/1958 | Carroll | 15/244 R |
| 3,051,979 | 9/1962 | Parsons | 15/104.94 |
| 3,098,252 | 7/1963 | Sundquist | 15/104.92 |
| 3,161,903 | 12/1962 | Worthington | 15/244 R |
| 3,257,679 | 6/1966 | Duskins | 15/244 R |
| 3,317,944 | 5/1967 | Napier et al. | 15/244 R |
| 3,378,873 | 4/1968 | Strout | 15/104.92 |
| 4,058,869 | 11/1977 | Wheeler | 15/244 R |

*Primary Examiner*—W. E. Hoag

*Attorney, Agent, or Firm*—Scrivener, Clarke, Scrivener and Johnson

[57] ABSTRACT

Cup handles made from clay have their seams removed by the handle being pushed along a passage of appropriate cross-section in a sponge. The sponge is washed after use by the introduction of water into the passage and by squeezing the sponge. The invention provides for the outer surface of the sponge to be treated all over to render it at least substantially impermeable to water. In use, when the sponge is squeezed, water is expelled only from the passage, and thus the uncontrolled flow of water encountered with sponges having permeable outer surfaces is avoided. Rigid plates may cover those parallel faces of the sponge into which the ends of the passage open, the plates having slots aligned with the ends of the passage. The sponges may be incorporated in a handle de-seaming machine operating cyclically.

11 Claims, 5 Drawing Figures

SPONGES FOR USE IN REMOVING SEAMS FROM CLAY HANDLES

This invention relates to sponges for use in removing seams from clay handles.

In the manufacture of cups with handles it is customary, in the ceramics industry, for cups and their associated handles to be made separately and later joined together before the clay is fired. Cup handles made separately from the cups to which they are to be attached usually have small ridges, referred to as seams, along both sides thereof, which seams are caused by imperfectly joined mould-halves being used for moulding the handles. These seams would be unsightly if they appeared on the handle of a finished cup and so it is customary for them to be removed before the handles are attached to cups.

The method usually used hitherto in removing seams from cup handles has involved an operator wiping both sides of the handle, with, for example, a damp sponge. This method requires the exercise of considerable skill by the operator to avoid distortion of the handle during wiping, and occupies considerable time. It has previously been recognised that it is desirable to replace this wiping operation by a process effected by a machine which can be operated without requiring the exercise of great skill by the operator and which will rapidly remove seams from cup handles without causing distortion thereof.

A machine which has been introduced for the foregoing purpose has a turntable which carries four sponges provided with profiled passages of cross-section similar to the profile of the handles, but slightly narrower. Handles are pushed along the passages in the operation of the machine, first in one direction and then back again so that the seams are removed and the handles smoothed symmetrically about the longitudinal central planes in which these seams lie. In using the machine, the operator removes the sponges to wash them after they have operated upon a few handles, squeezes excess moisture from them and puts them back. Not only is such interruption in the operation of the machine time-consuming, but the maintenance of a steady output of satisfactorily smooth handles is unreliable because it depends upon the care and attention given by the operator.

A modification of the aforementioned machine, constituting a development thereof, incorporates means whereby, after each de-seaming operation on a cup handle, the sponges, which are accommodated in box-like compartments of a turn-table of the machine, are cleansed by the application of water to the walls of the passages and squeezed to remove excess water. This modified machine enables uniformly satisfactorily smoothed handles to be obtained at a regular, uniform output, but suffers from the drawback that the water expelled from a sponge when it is squeezed tends to flow widely and drip uncontrollably from the bottom of its box-like compartment and also to flood upwards and settle on the top of the sponge even when the sponge recovers its shape after having been squeezed.

Accordingly, it is an object of the invention to provide, in a machine having a sponge with a profiled passage in it for de-seaming cup handles, means for controlling the flow of excess water that is expelled from the sponge by squeezing it after a cleansing operation in the cycle of the machine.

From one aspect the present invention consists in a sponge having a profiled passage for de-seaming cup handles which are pushed along it, the outer surface of the sponge being treated all over to render it at least substantially impermeable to water.

In use, when the sponge is squeezed, after water has been applied to it in a cleansing operation, excess water is expelled through the passage. As the water is discharged at only one or two places its flow can be readily controlled, and the uncontrolled flow encountered with the sponges previously employed can be avoided.

The sponge preferably has a pair of mutually parallel faces with rigid plates stuck to them. In use the sponge can be squeezed by pressing the rigid plates towards each other. The plates themselves may serve to prevent water escaping through the faces to which they are stuck; alternatively, adhesive used to stick the plates to the sponge may serve to prevent the escape of water, or said faces of the sponge may be treated in some other manner to prevent the escape of water through them.

In one possible arrangement, the profiled passage terminates in openings in faces of the sponge other than those to which the rigid plates are stuck. In a preferred arrangement, however, the profiled passage terminates in openings in said parallel faces, the rigid plates being formed with profiled slots aligned with the openings. In either arrangement that part of the outer surface of the sponge not covered by the rigid plates is preferably rendered at least substantially impermeable to water by means which is flexible so as to enable the sponge to be squeezed by pressing the rigid plates towards each other.

The outer surface of the sponge can be rendered impermeable to water, or substantially so, in any of a number of ways. Any treatment may be applied to the whole of the outer surface of the sponge or to a part only thereof. For example, at least part of the outer surface of the sponge may be rendered at least substantially impermeable to water by means of a flexible, impermeable coating formed by the application to the surface of a liquid material which is then caused or allowed to set. The liquid material may comprise a two-part curing rubber or resilient resin coating composition. Alternatively at least part of the outer surface of the sponge may be rendered at least substantially impermeable to water by means of a sheet or film of flexible, impermeable material stuck to the surface. In another alternative at least part of the outer surface of the sponge is rendered at least substantially impermeable to water by being heated to seal the pores. In yet another alternative the sponge is made by a moulding process such that at least part of the outer surface of the sponge is rendered at least substantially impermeable to water by the sealing, during the moulding process, of those pores of the sponge adjacent to the wall of the mould in which the sponge is formed. In this last alternative the profiled passage is preferably cut in the sponge after the formation of the sponge.

Where the handle to be de-seamed is C-shaped (or open), the sponge has a passage of suitable cross-section to engage both the inside and the outside seams of the handle. If D-shaped handles (or closed handles) are to be de-seamed, the sponge is modified so as to provide a separate inner sponge portion of cross-section complementary to the profile of the inside of the handle, and an outer portion having a passage large enough to accommodate the inner portion and of a cross-section such as to leave a gap, between the inner and outer portions, of similar cross-section to, but slightly narrower than, the profile of the handle. It is, of course, the outer surface of the outer portion of such a sponge for a D-shaped handle (having a passage for the cup handles) and not the inner portion (which has no such passage), that would be treated to render it impermeable, or substantially so, in accordance with the invention.

From another aspect the present invention consists in a cup handle de-seaming maching provided with a sponge of the kind outlined above, and comprising means for supporting the sponge, means for pushing a handle one way along the passage, means for pushing the handle the other way along the passage, means for applying water to the walls of the passage to clean the sponge, and means, incorporating a presser member, for squeezing the sponge to expell excess water.

One particular form of machine for de-seaming cup handles embodying the present invention and incorporating sponges also embodying the present invention will now be described in more detail, by way of example, with reference to the accompanying drawings, in which.

Figure 1:
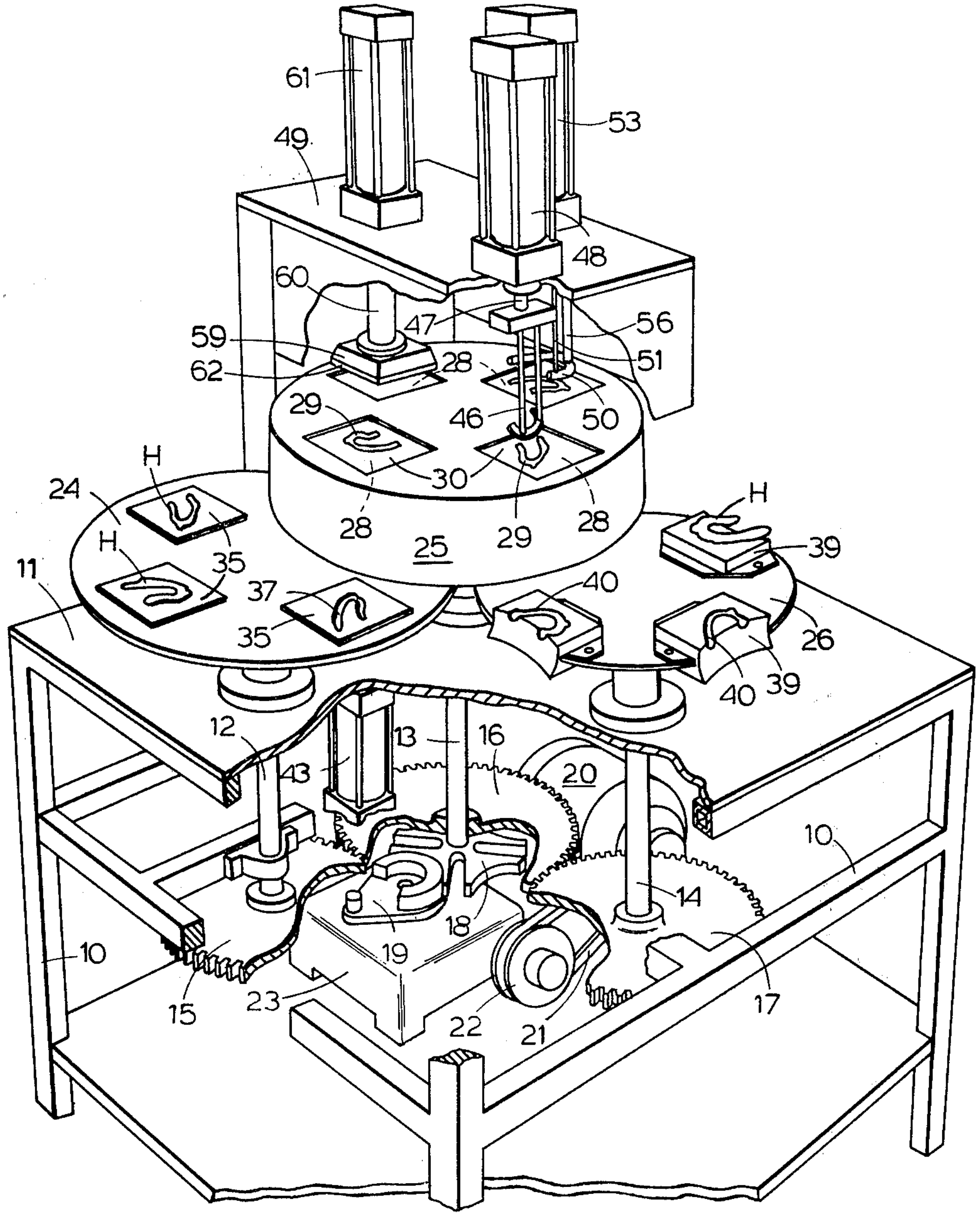
FIG. 1 is a view in perspective, with parts broken away, of the machine for de-seaming handles.

The machine illustrated in the accompanying drawings comprises a frame 10 arranged to stand on the floor, and having a table top 11. Mounted in suitable bearings in the frame are three vertical shafts 12, 13 and 14 interconnected together by meshing gears 15, 16 and 17. The shaft 13 also carries a star wheel 18 of a geneva mechanism designed to effect step-by-step rotation of the shaft 13 through steps of 90° each. The geneva mechanism also comprises a conventional driving member 19 arranged to be driven by an electric motor 20 through a belt 21 and a pulley 22 mounted on an input shaft of a gear box 23.

The shafts 12, 13 and 14 project through the table top 12 and at their upper ends carry respectively three turntables 24, 25 and 26. The turntables 24 and 26 are substantially horizontal discs mounted at substantially the same height in side-by-side relationship to each other. The turntable 25 overlaps the turntables 24 and 26. The turntable 25 is of hollow construction with four box-like compartments 27 disposed uniformly about the axis of the shaft 13. Each compartment 27 contains a sponge 28 with a passage 29 through it which has a cross-section similar to, but narrower than, the profile of each of the handles H to be de-seamed. Top and bottom metal plates 30 and 31 respectively are stuck to the upper and lower surfaces of the sponges. Each of the metal plates 30 and 31 has in it a slot 32 in shape similar to that of the cross-section of the passage 29 but rather larger. The plates 30 and 31 are attached to the sponges in such a manner as to seal the top and bottom surfaces of the sponges against expulsion of water except through the slots 32. The passages 29 in the sponges are vertical. Pressure on the top plate 30 causes the sponge 28 below it to be squeezed, as will be described hereinafter.

Figure 5:
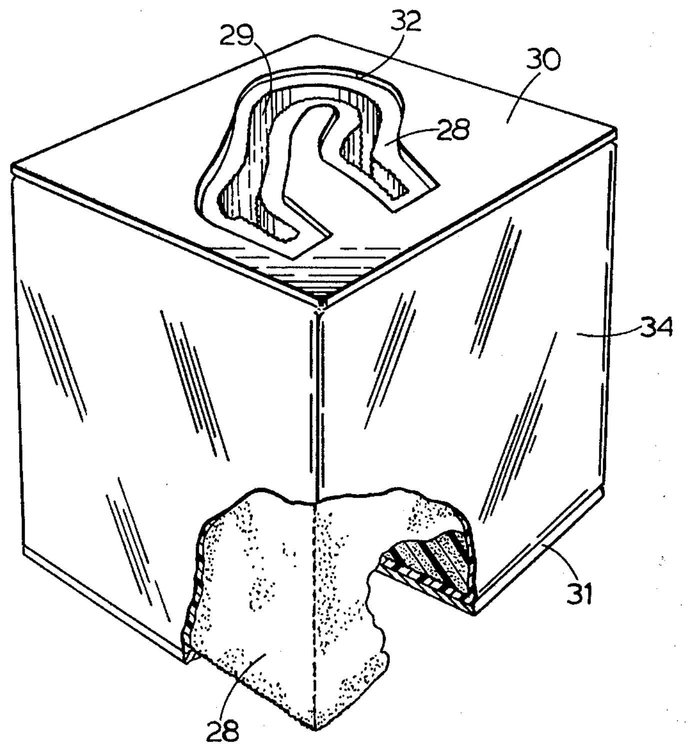
FIG. 5 is a perspective view, partly broken away, of one of the four sponges of the machine.

The sponges 28, with the plates 30 and 31 bonded to them, are located between upper and lower flanges 33 of the compartments and can readily be manoeuvred in and out of the compartments. When the machine is to be used with handles of a different profile the sponges 28 are removed and are replaced by sponges having passages of appropriate cross-section. Each of the bottom plates 31 rests on a peripheral seal (not shown) which prevents water passing between the plate and the flange 33 on which it rests. One of the sponges 28 is shown in FIG. 5. In addition to the top and bottom of the sponge being sealed by the plates 30 and 31 the side walls have also been treated to render them impermeable, in this case by the application to the side walls of a suitable rubbery composition which seals the pores and forms a continuous skin 34.

The turntable 24 has four handle supports located at uniform angular intervals around the axis of the shaft 12. Each handle support comprises a rectangular plate 35 with a piece of sponge material 36 stuck beneath it. The plate 35 is formed with a slot 37 of a shape similar to the profile of a handle H but wider, while the sponge material 36 is formed with a slot 38 of a shape that is similar to the profile of the handle but narrower so that a handle can rest on it without falling through, Indeed, the slot 37 is of a shape which flares open at the top and is nearly closed lower down. The plates 35 are readily replaceable by others suitable for handles of different shapes.

The turntable 26 (FIG. 3) carries four holders 39 of plastics material disposed at uniform intervals around the axis of the shaft 14. Each holder has a groove 40 in its upper surface of a shape similar to the profile of the handles H, and two vertical bores 41 lead through the holders to the lower surface from the bottom of the groove.

Figure 4:
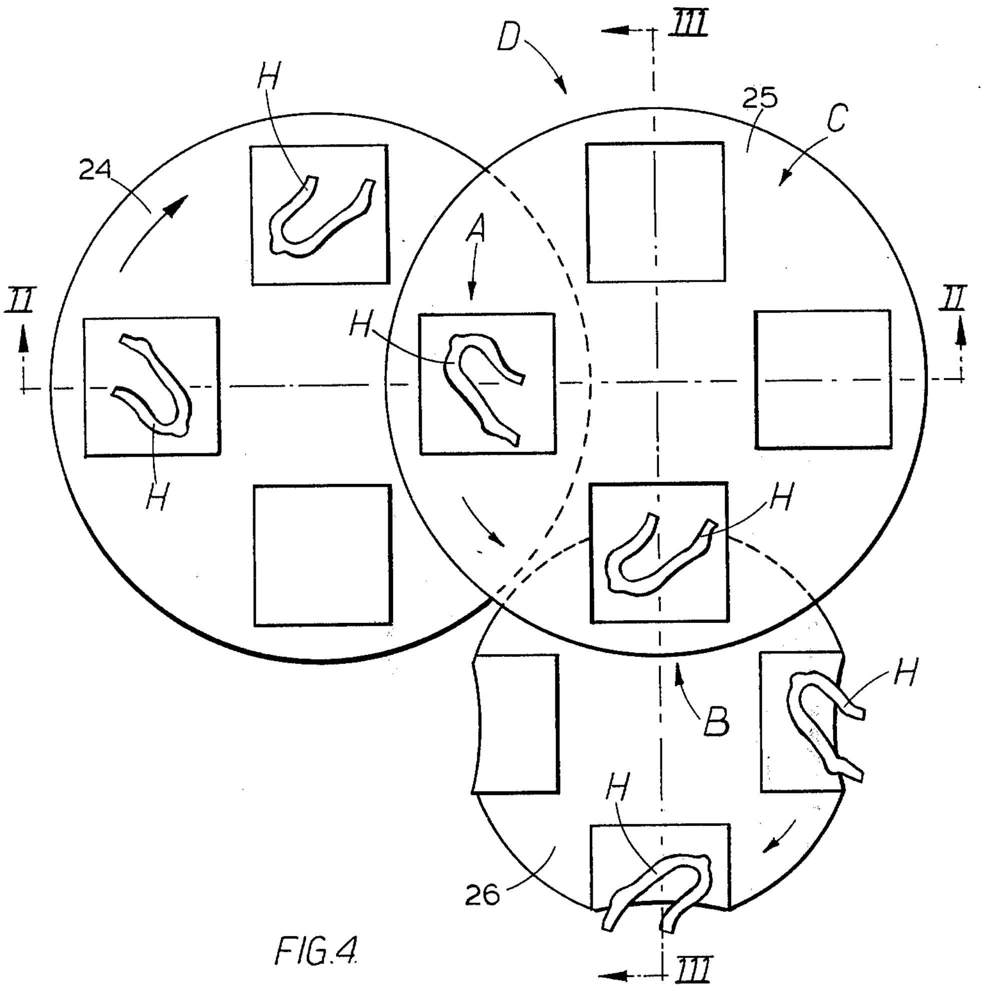
FIG. 4 is a diagrammatic plan of three turntables of the machine.

The disposition of the turntables 24, 25 and 26, and of the geneva mechanism by which they are driven in steps of 90°, is such that at a first station A (FIG. 4) one of the sponges 36 of the handle supports on the turntable 24 has its slot 38 in alignment below the passage 29 in one of the sponges 28 on the turntable 25, and at the next station B, to which the sponges pass from A as the turntable 25 moves anticlockwise in the operation of the machine, the passage 29 in the sponge 28 is in alignment with a handle-shaped groove 38 of a holder 39 of the turntable 26.

Figure 2:
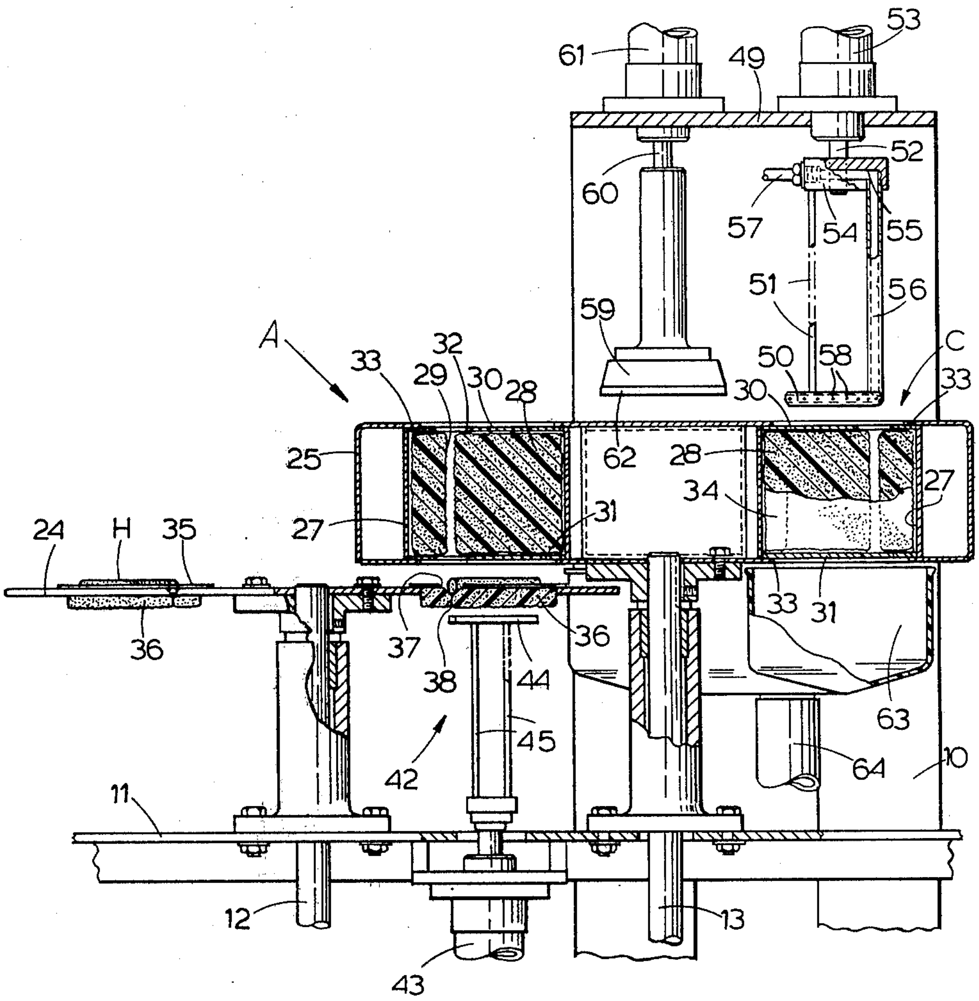
FIG. 2 is a view in vertical cross-section through part of the machine, on the line indicated at II—II of FIG. 4.
Figure 3:
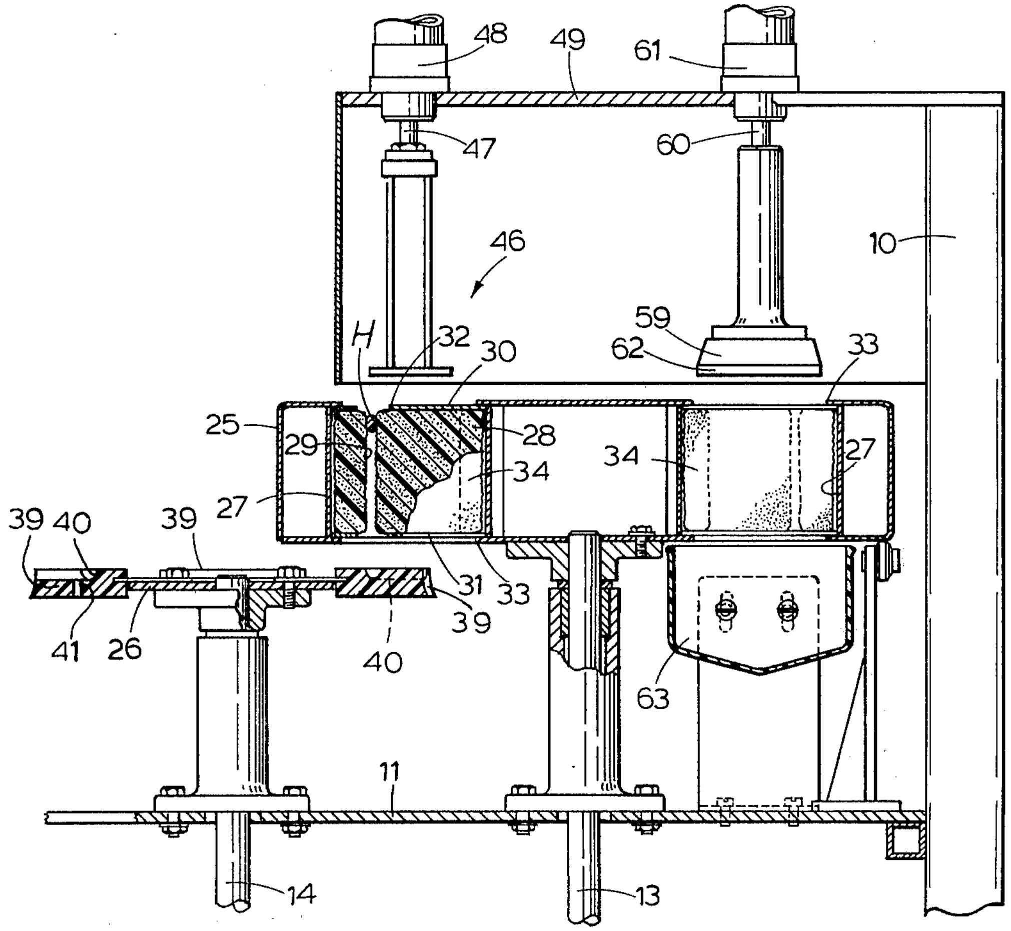
FIG. 3 is a view in vertical cross-section, similar to that of FIG. 2 but on the line III—III of FIG. 4, at right angles to the section of FIG. 2.

Below the turntable 24 (FIG. 2) at station A is a pusher 42 movable up and down by the piston of a pneumatic piston-and-cylinder unit 43. The pusher 42 comprises a handle-engaging bar 44 of size and profile similar to those of handle H, supported in a horizontal plane by two rods 45 secured to the piston rod of the unit 43. The bar 44, on being raised, can pass up through the slot 38 of one of the sponges 36 on the turntable 24, lift a handle H off the sponge and push it most of the way up the passage 29 in one the of the sponges 28 (FIG. 3).

Above the turntable 25 (FIG. 3) at station B of the machine is a pusher 46 similar to the pusher 42 but mounted the other way up on the depending piston rod 47 of a pneumatic piston-and-cylinder unit 48 supported by an overhanging bracket 49 of the frame 10. Thus, on a down stroke of the pusher 46, the handle H is pushed down through the passage 29 of the sponge 28 and ejected onto the holder 39 waiting below.

On the anticlockwise rotation of the turntable 25, the sponge 28 is carried from station B to a washing station C (FIGS. 2 and 4), above which a hollow tube 50 of similar profile to the cross-section of the passages 29 in the sponges 28 is mounted in a horizontal plane at the lower end of two vertical rods 51 depending from the piston rod 52 of a pneumatic piston-and-cylinder unit 53 mounted on the bracket 49. The piston rod 52 terminates at its lower end in a block 54 having a bore 55 in it which communicates by means of a vertical tube 56 with the tube 50. A flexible hose 57 is connected at one end to the block 54 in communication with the bore 55 and at its other end to a supply of water controlled by a valve (not shown). The wall of the tube 50 has perforations 58 in it. The arrangement is such that, while a sponge 28 which has just been used to smooth a handle H is at rest at station C, the tube 50 can be moved down the passage 29 and up again, and water can be expelled during all or part of its traverse of the passage through the perforations 58 under control of the aforementioned water supply valve.

From station C, the sponge 28 moves, in the operation of the machine, to station D above which is a presser member 59 mounted on the vertically depending piston rod 60 of a pneumatic piston-and-cylinder unit 61 supported by the bracket 49. The presser member 59 has a flat under-surface provided by a resilient impermeable pad 62 small enough to enable it to pass through the upper flanges of the compartments 27 in the turntable 25, but large enough to cover the passage 29 in each of the sponges. On its descent the presser member 59 engages the top plate 30 and squeezes the sponge, the pad 62 blocking the top of the passage 29 and thus compelling water expelled from the sponge to flow from the bottom of the passage. An arcuate trough 63 (FIG. 2) extends below the turntable 25 to catch the water draining from the sponges at stations C and D and during their movement from one station to the other. Water drains from the trough through a hose 64.

In the operation of the machine, the driving member 28 rotates continuously so that the turntables 24, 25 and 26 rotate in synchronism step-by-step. The units 43, 48, 53 and 61 execute advance and return strokes in unison while the turntables are stationary, so that each handle H progresses from the slot 38 in the sponge 36 on which it rests on turntable 24 at station A, to a position near the top of the passage 29 in a sponge 28, is then conveyed to station B where it is pushed down through the sponge and ejected onto the holder 39 (the handle having been now smoothed to remove its seam, its to and fro passage in the sponge ensuring retention of symmetry about the plane of the seam). From station B the handle can be conveyed elsewhere for the carrying out of subsequent operations, for example the cutting of those surfaces thereof that will be attached to the body of a cup, while its orientation is retained by the grove 40 in which it rests.

Meanwhile, the sponge 28 in which the handle has been smoothed, passes to stations C and D to be washed and to have excess moisture removed. The machine can thus continue to operate with long uninterrupted periods of output as little or no build up of clay material in the sponges occurs. The control of the cleansing water achieved by sealng the sponges and compelling excess water to flow only from the bottom of passages 29 when the sponges are squeezed avoids any risk of surplus water coming into contact with the handles before or after they have been de-seamed.

We claim:

1. A sponge for deseaming cup handles said sponge defining generally C-shaped or D-shaped passage therein conforming to the shape of a cup handle the outer surface of the sponge being treated all over to render it at least substantially impermeable to water.

2. A sponge according to claim 1 in which at least part of the outer surface of the sponge is rendered at least substantially impermeable to water by means of a flexible, impermeable coating formed by the application to the surface of a liquid material which is then caused or allowed to set.

3. A sponge according to claim 1 in which at least part of the outer surface of the sponge is rendered at least substantially impermeable to water by means of a sheet or film of flexible, impermeable material stuck to the surface.

4. A sponge according to claim 1 which is made of a thermoplastic material and in which at least part of the outer surface of the sponge is rendered at leat substantially impermeable to water by being heated to seal the pores.

5. A sponge according to claim 1 made by a moulding process such that at least part of the outer surface of the sponge is rendered at least substantially impermeable to water by the sealing, during the moulding process, of those pores of the sponge adjacent to the wall of the mould in which the sponge is formed.

6. A sponge according to claim 5 in which the profiled passage is cut in the sponge after the formation of the sponge.

7. A cup handle de-seaming machine provided with a sponge according to claim 1, and comprising means for supporting the sponge, means for pushing a handle one way along the passage, means for pushing the handle the other way along the passage, means for applying water to the walls of the passage to clean the sponge, and means, incorporating a presser member, for squeezing the sponge to expell excess water.

8. A machine according to claim 7 in which the presser member in operation presses downwards on the sponge and blocks the upper end of the passage.

9. A sponge according to claim 1 in which the sponge has a pair of mutually parallel faces, a pair of rigid plates, one such plate being stuck to each of said faces.

10. A sponge according to claim 9 in which the profiled passage terminates in openings in said parallel faces, the rigid plates being formed with profiled slots aligned with the openings.

11. A sponge according to claim 1 in which that part of the outer surface of the sponge not covered by the rigid plates is rendered at least substantially impermeable to water by means which is flexible so as to enable the sponge to be squeezed by pressing the rigid plates towards each other.

* * * * *